(12) United States Patent
Sugano et al.

(10) Patent No.: US 7,488,782 B2
(45) Date of Patent: Feb. 10, 2009

(54) PROCESS FOR PRODUCING HYDROGENATED POLYMERS

(75) Inventors: Yuuichi Sugano, Niigata (JP); Yasuhiro Kushida, Niigata (JP); Tatsuya Yamauchi, Niigata (JP); Hideyuki Sato, Niigata (JP); Yoshikazu Shima, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 11/679,222

(22) Filed: Feb. 27, 2007

(65) Prior Publication Data

US 2007/0185277 A1   Aug. 9, 2007

(30) Foreign Application Priority Data

Feb. 27, 2006   (JP)   ............... 2006-051008

(51) Int. Cl.
C08C 19/02   (2006.01)
C08F 220/18   (2006.01)
C08F 12/08   (2006.01)

(52) U.S. Cl. ............... 525/330.3; 525/333.3; 525/338; 525/339

(58) Field of Classification Search ............... 525/330.3, 525/333.3, 338, 339

See application file for complete search history.

(56) References Cited

U.S. PATENT DOCUMENTS

| 4,107,418 | A | | 8/1978 | Yatsu et al. | |
|---|---|---|---|---|---|
| 4,954,576 | A | * | 9/1990 | Kubo et al. | ............... 525/339 |
| 5,612,422 | A | | 3/1997 | Hucul et al. | |
| 5,654,253 | A | | 8/1997 | Hucul et al. | |
| 5,700,878 | A | | 12/1997 | Hucul et al. | |
| 6,417,287 | B1 | | 7/2002 | Wege et al. | |
| 6,420,491 | B1 | | 7/2002 | Wege et al. | |
| 6,509,510 | B1 | | 1/2003 | Wege et al. | |

FOREIGN PATENT DOCUMENTS

| DE | 1131885 | | 6/1962 |
|---|---|---|---|
| EP | 317 263 | * | 5/1989 |
| EP | 317263 | | 5/1989 |
| EP | 317263 A2 | * | 5/1989 |
| EP | 1193274 | | 4/2002 |
| EP | 1702934 | | 9/2006 |
| EP | 1757626 | | 2/2007 |
| JP | 01-213306 | | 8/1989 |
| JP | 03-094555 | | 4/1991 |
| JP | 11-504959 | | 5/1999 |
| JP | 2000-095815 | | 4/2000 |
| JP | 2001-527095 | | 12/2001 |
| JP | 2002-521508 | | 7/2002 |
| JP | 2002-521509 | | 7/2002 |
| JP | 2002-249515 | | 9/2002 |
| JP | 2003-138078 | | 5/2003 |
| JP | 2003-529646 | | 10/2003 |
| JP | 2004-149549 | | 5/2004 |
| WO | WO 01/74912 A1 | | 10/2001 |
| WO | WO 2005/116090 A | | 12/2005 |

OTHER PUBLICATIONS

European Search Report for Application No. EP 07 10 2759, dated May 7, 2007.
Database Registry, Chemical Abstracts, Nov. 29, 2004, "2-Propenoic Acid, 2-methyl-, methyl ester, polymer with ethenylbenzene and ethenylcyclohexane", XP 002428876.

* cited by examiner

*Primary Examiner*—Roberto Rábago
(74) *Attorney, Agent, or Firm*—Antonelli, Terry, Stout & Kraus, LLP.

(57) ABSTRACT

A process for producing a hydrogenated polymer, which includes a step of hydrogenating aromatic rings of an aromatic vinyl compound—(meth)acrylate copolymer. In the process, the copolymer having a ratio, A/B, of from 0.25 to 4.0 (A is a molar number of constitutional units derived from the (meth)acrylate monomer, and B is a molar number of constitutional units derived from the aromatic vinyl monomer) is hydrogenated in a solvent in the presence of a catalyst which is composed of zirconium oxide supporting palladium. By the process, a highly transparent, hydrogenated polymer is stably and rapidly produced for a long period of time or repeatedly.

9 Claims, No Drawings

PROCESS FOR PRODUCING HYDROGENATED POLYMERS

BACKGROUND OF THE INVENTION

1. Field of the Invention

The present invention relates to a process for producing hydrogenated polymers including a step of hydrogenating the aromatic rings of a copolymer of an aromatic vinyl compound and a (meth)acrylate in the presence of a catalyst which is composed of palladium supported on the carrier mainly constituted by zirconium oxide. The hydrogenated polymers obtained by the above process exhibit a high transparency, a low birefringence, a high heat resistance, a high surface hardness, a low water absorption, a low specific gravity, a high transfer property and an excellent mold releasability. Particularly, because of their excellence in the properties required in optical materials, the hydrogenated polymers are used in wide applications such as optical lenses, light guide plates, light diffuser plates, optical disk substrates, and display front panels.

2. Description of the Prior Art

In recent years, amorphous plastics such as acrylic resins, methacrylic resins, styrene-based resins, polycarbonate resins and cyclic polyolefin resins have been used in various applications, in particular, there is an increasing demand for the amorphous plastics in the fields of optical materials such as optical lenses and optical disk substrates because of their excellent optical properties. These optical materials have been required to have not only a high transparency but also a high performance excellent in the balance in a high heat resistance, a low water absorption, mechanical properties, etc.

However, the conventional optical materials do not necessarily satisfy all of these properties and still have problems to be solved. For example, polystyrenes are mechanically brittle, large in the birefringence and poor in the transparency. Although having a good heat resistance, polycarbonates have a large birefringence and a poor transparency nearly equal to that of the polystyrenes. Polymethyl methacrylate has a high transparency, but has a poor dimensional stability due to a very high water absorption and a low heat resistance. Polyvinyl cyclohexane obtained by hydrogenating the aromatic ring of polystyrene exhibits a high transparency, but has a low mechanical strength, a poor heat stability and a poor adhesion to other materials (Japanese Patent 3094555, JP 2004-149549A and JP 2003-138078A). In order to improve the adhesion property, there has been proposed a method of mixing an aromatic ring-hydrogenated product of polystyrene, a double bond/aromatic ring-hydrogenated product of a conjugated diene-styrene copolymer, or a saturated hydrocarbon resin (Japanese Patent 2725402). However, the above method requires a complicated operation. Also, there is disclosed that a hydrogenated product, which is obtained by copolymerizing a vinyl aromatic compound such as styrene with an unsaturated dibasic acid such as maleic anhydride and then hydrogenating 30% or more of the aromatic rings of the resultant copolymer, is improved in the transparency and birefringence as compared with polystyrene (JP 7-94496B). However, the proposed hydrogenated product is still insufficient in the optical properties as compared with acrylic resins.

In addition, copolymers of methyl methacrylate (MMA) and styrene (MS resins) exhibit a high transparency and are well-balanced in the dimensional stability, rigidity and specific gravity, but have a large birefringence.

Aromatic ring-hydrogenated products of MS resins (MSH resins), in particular, MSH resins having an MMA copolymerization rate of 50% or higher, are considerably improved in the birefringence and exhibit a good balance in the transparency, heat resistance and mechanical properties as compared with MS resins.

The hydrogenation of the aromatic rings of aromatic polymers is known in the art (DE 1131885A). It has been recognized in the art that the degree of hydrogenation of the aromatic rings should be increased for a high transparency and the degree of hydrogenation should reach near 100%, otherwise a highly transparent resin cannot be obtained. This is because when the degree of hydrogenation of the aromatic rings is low, the resultant hydrogenated polymers form a block structure to reduce the total light transmittance.

A solid catalyst composed of a carrier such as activated carbon, alumina, silica and diatomaceous earth and a metal such as Pd, Pt, Rh, Ru, Re and Ni supported on the carrier is preferably used because of easiness of separation from the reactants. Although many examples are known about the hydrogenation of not only aromatic polymers but also other polymers such as conjugated diene polymers, it has been difficult to obtain a high degree of hydrogenation and a high reaction rate because of a low reactivity due to the high molecular weight. It is also known that the catalytic activity is easy to be reduced when repeatedly used in the reaction. The reduction in the catalytic activity results in a lowered degree of hydrogenation, to impair the transparency of the resins. To improve the reaction activity, the kind, fine pore structure and particle size of carrier have been examined. For example, there have been reported a method of producing a hydrogenated polystyrene having a degree of aromatic ring-hydrogenation of about 70% by using a catalyst composed of palladium supported on a silica carrier having a particle size of less than 100 μm (Japanese Patent 3094555), and a method of producing a hydrogenated polystyrene by using a catalyst formed by supporting Pt and Rh on a silica carrier having a large pore size of exceeding 600 Å (JP 11-504959A). There is also disclosed a hydrogenation method in which the degree of aromatic ring-hydrogenation is kept low while hydrogenating the ethylenically unsaturated bond in a high degree of hydrogenation in the presence of a catalyst obtained by supporting a group VIII metal on a porous carrier. In the porous carrier, 95% or more of the total pore volume is occupied by pores with a pore size of 450 Å, and the surface area of the supported metal occupies within 75% of the surface area of the carrier (Japanese Patent 320057).

JP 2002-521509A reports that the aromatic rings of polystyrene are completely hydrogenated without decreasing the molecular weight in the presence of a catalyst formed by supporting a group VIII metal on a carrier such as silica and alumina in which the pores having a pore size of 100 to 1000 Å occupy 70 to 25% of the total pore volume, and JP 2002-521508A reports that the aromatic rings of polystyrene are completely hydrogenated without decreasing the molecular weight in an ether linkage-containing hydrocarbon in the presence of a commercially available catalyst for the hydrogenation of low-molecular weight compounds, which is formed by supporting a subgroup VIII metal on a carrier such as silica and alumina in which the pores having a pore size of 100 to 1000 Å occupy less than 15% of the total pore volume of the carrier. JP 1-213306A discloses that a catalyst formed by supporting a metal on an oxide of a group IVa element such as titanium oxide and zirconium oxide exhibits a high catalytic activity even when reused in the hydrogenation of a conjugated diene-based polymer such as NBR. However, this patent document describes only the hydrogenation of a conjugated diene-based polymer and is completely silent about the hydrogenation of the aromatic rings. JP 2000-95815A discloses that the unsaturated bond (inclusive of aromatic ring) of an aromatic-conjugated diene copolymer is efficiently hydrogenated without the elution of the metal components in the presence of a catalyst which is obtained by adding an alkali metal or an alkaline earth metal to a carrier in which the pores with a pore size of 100 to 100000 nm occupy 50 to 100% of the total pore volume of the carrier, and then, supporting a platinum group metal on the carrier so that 90% or more of the metal is present within the surface portion of the carrier (depth within 1/10 of the pore diameter).

JP 2003-529646A reports that the catalyst activity can be improved by conducting the hydrogenation after removing catalyst poisons from a polymerization product solution by an activated alumina, and JP 2002-249515A reports that the productivity can be increased by improving the linear reaction rate in a fixed bed reaction.

The hydrogenation of aromatic rings is largely affected by the solvent used because it is a polymer reaction. In the known hydrogenation methods, various reaction solvents such as hydrocarbons, alcohols, ethers and esters are used (JP 2001-527095A). However, hydrocarbons and alcohols are poor solvents for the resins. Ethers such as 1,4-dioxane have a low ignition point and the solvent should be replaced with another solvent such as toluene before the volatilizing extrusion at a high temperature. Further, tetrahydrofuran as the ether solvent is unstable because readily undergoes a ring opening reaction. Esters are safe and relatively stable, and allow the hydrogenation to proceed rapidly. However, esters make the obtained reaction solution and solid resin cloudy, to reduce the transparency. To solve this problem, there has been proposed a method in which a highly transparent hydrogenated aromatic polymer is safely, stably and rapidly produced by conducting the hydrogenation in a mixed solvent of an ether and an alcohol. However, the separation of two kinds of solvents makes the process complicated. Japanese Patent 2890748 discloses that a high transparency can be achieved even at a low degree of hydrogenation by using a mixed solvent of an ether solvent with an alcohol or water. However, the proposed method is not applicable to many polymers because it is effective for only limited aromatic polymers.

As described above, the conventional production of aromatic ring-hydrogenated polymers having high optical properties involves various difficulties and problems. In particular, although the hydrogenated polymers obtained by hydrogenating the aromatic rings of a copolymer of an aromatic vinyl compound and a (meth)acrylate exhibit excellent properties such as a high transparency, low birefringence, high heat resistance, high surface hardness, low water absorption and low specific gravity, no method suitable for stably and rapidly producing such polymers repeatedly or for a long period of time has been provided until now.

SUMMARY OF THE INVENTION

The present invention provides a process for stably and rapidly producing an aromatic ring-hydrogenated polymer from a copolymer of an aromatic vinyl compound and a (meth)acrylate repeatedly or for a long period of time.

As a result of extensive researches for solving the above problems, the inventors have found that a highly transparent, aromatic ring-hydrogenated polymer can be stably and rapidly produced by hydrogenating an aromatic vinyl compound-(meth)acrylate copolymer having a molar ratio A/B (A is a molar number of the constitutional units derived from the (meth)acrylate monomer, and B is a molar number of constitutional units derived from the aromatic vinyl monomer) within a specific range in the presence of a catalyst composed of zirconium oxide supporting palladium.

Thus, the present invention relates to a process for producing a hydrogenated polymer, which includes a step of hydrogenating aromatic rings of an aromatic vinyl compound-(meth)acrylate copolymer in a solvent in the presence of a catalyst, wherein the aromatic vinyl compound-(meth)acrylate copolymer has a molar ratio A/B of from 0.25 to 4.0 wherein A is a molar number of constitutional units derived from the (meth)acrylate monomer, and B is a molar number of constitutional units derived from the aromatic vinyl monomer; and wherein the catalyst is composed of zirconium oxide supporting palladium.

The present invention further relates to a hydrogenated polymer produced by the process mentioned above.

The present invention still further relates to an optical composition containing the hydrogenated polymer.

DETAILED DESCRIPTION OF THE INVENTION

The present invention is described below in detail. Examples of the aromatic vinyl compound used in the present invention include styrene, α-methylstyrene, p-hydroxystyrene, alkoxystyrene and chlorostyrene, with styrene being preferred.

Examples of the (meth)acrylate used in the present invention include alkyl (meth)acrylates such as methyl (meth)acrylate, ethyl (meth)acrylate, butyl (meth)acrylate, lauryl (meth)acrylate, stearyl (meth)acrylate, cyclohexyl (meth)acrylate and isobornyl (meth)acrylate; hydroxyalkyl (meth)acrylates such as 2-hydroxyethyl (meth)acrylate, 2-hydroxypropyl (meth)acrylate and 2-hydroxy-2-methylpropyl (meth)acrylate; alkoxyalkyl (meth)acrylates such as 2-methoxyethyl (meth)acrylate and 2-ethoxyethyl (meth)acrylate; aromatic ring-containing (meth)acrylates such as benzyl (meth)acrylate and phenyl (meth)acrylate; and phospholipid-analogous functional group-containing (meth)acrylates such as 2-(meth)acryloyloxyethyl phosphoryl choline, with the sole use of the alkyl methacrylate being preferred and the combined use of the alkyl methacrylate and the alkyl acrylate being more preferred in view of the balance of the properties. If combinedly used, the alkyl methacrylate is used in an amount of from 80 to 100 mol %, and the alkyl acrylate is used in an amount of from 0 to 20 mol %. The particularly preferred alkyl methacrylate is methyl methacrylate, and the particularly preferred alkyl acrylate is methyl acrylate or ethyl acrylate.

In the present invention, acrylic acid and methacrylic acid are collectively called "(meth)acrylic acid," and acrylate and methacrylate are collectively called "(meth)acrylate."

The aromatic vinyl compound and the (meth)acrylate may be polymerized by known methods, and preferably by a radical polymerization in industrial productions because of its simplicity. The radical polymerization is conducted by known manners such as bulk polymerization method, solution polymerization method, emulsion polymerization method and suspension polymerization method. For example, in the bulk polymerization method and solution polymerization method, the polymerization is allowed to proceed continuously at 100 to 180° C. while continuously feeding a monomer composition which contains monomers, a chain transfer agent and a polymerization initiator to a complete mixing tank. In the solution polymerization method, the monomer composition is fed together with a solvent, for example, hydrocarbon solvents such as toluene, xylene, cyclohexane and methylcyclohexane; ester solvents such as ethyl acetate; ketone solvents such as acetone and methyl ethyl ketone; ether solvents such as tetrahydrofuran and dioxane; and alcohol solvents such as methanol and isopropanol. After the polymerization, the reaction product solution is withdrawn from the polymerization tank and introduced into a volatilizing extruder or a vacuum volatilizing tank for removing volatile components, to obtain the aimed copolymer.

Since the composition of constitutional units of the aromatic vinyl compound-(meth)acrylate copolymer is not necessarily the same as the composition of monomers charged, the amount of each monomer actually incorporated into the copolymer by the polymerization varies depending upon the polymerization rate and the reactivity of each monomer. If the polymerization rate is 100%, the composition of the constitutional units of the copolymer and the composition of the charged monomers are the same. However, since the polymerization rate is generally from 50 to 80% in actual productions, the monomer having a higher reactivity is preferentially incorporated into the copolymer. As a result, the composition of the charged monomers differs from the composition of the constitutional units of the copolymer. Therefore, it is recommended to appropriately select the composition of the monomers charged.

In the aromatic vinyl compound-(meth)acrylate copolymer, the molar ratio A/B, wherein A is the molar amount of the constitutional units derived from the (meth)acrylate monomer and B is the molar amount of the constitutional units derived from the aromatic vinyl monomer, is from 0.25 to 4.0 and preferably from 0.4 to 4.0. If less than 0.25, the resultant hydrogenated polymer may be unsuitable for practical use because of an insufficient mechanical strength. If exceeding 4.0, the effect of improving properties, for example, the increase in the glass transition temperature by the hydrogenation, cannot be sufficiently obtained because of a small amount of the aromatic rings to be hydrogenated.

The weight-average molecular weight of the aromatic vinyl compound-(meth)acrylate copolymer is preferably from 10,000 to 1,000,000, more preferably from 50,000 to 700,000 and still more preferably from 100,000 to 500,000. A copolymer having a weight-average molecular weight of less than 10,000 or more than 1,000,000 can be also hydrogenated by the process of the present invention. However, if less than 10,000, the resultant hydrogenated polymer may be unsuitable for practical use in view of mechanical strength, and may be difficult to handle because of its high viscosity if more than 1,000,000. The weight-average molecular weight was determined by a gel permeation chromatography (GPC) using THF as the solvent and a standard polystyrene for calibration.

The hydrogenated polymer produced by the process of the present invention presents a transparent appearance because visible lights well pass through it. The total light transmittance of a 3.2 mm-thick molded product of the hydrogenated polymer, measured by the method according to JIS K7105, is preferably 90% or higher. Since the loss on the surface of the molded product due to reflection is not avoidable, the upper limit of the total light transmittance depends upon the refractive index. In optical applications, a higher transparency may be required. Therefore, the total light transmittance is more preferably 91% or higher and still more preferably 92% or higher. To achieve such higher transparency, it is preferred to uniformly hydrogenate the aromatic rings of the starting copolymer.

In general, it is difficult to completely hydrogenate the aromatic rings of an aromatic vinyl copolymer and some of the aromatic rings remain non-hydrogenated. The non-hydrogenated aromatic rings frequently cloud the resultant polymer. One reason for the clouding is that the part containing hydrogenated aromatic rings and the part containing the non-hydrogenated aromatic rings form different blocks. In particular, when the degree of aromatic ring-hydrogenation is low, the blocks are easily formed. To prevent the formation of blocks, the degree of hydrogenation is preferably 70% (mol %) or higher and more preferably 85% (mol %) or higher. The molecular weight of aromatic vinyl copolymer generally distributes, and the aromatic rings of a low-molecular weight aromatic vinyl copolymer are preferentially hydrogenated while the aromatic rings of a high-molecular weight aromatic vinyl copolymer remain non-hydrogenated, to cause the clouding. If the aromatic rings of a high-molecular weight aromatic vinyl copolymer are hydrogenated slower than those of a low-molecular weight aromatic vinyl copolymer, the aromatic rings of a low-molecular weight aromatic vinyl copolymer are preferentially hydrogenated, to make the resultant polymer easy to cloud. However, when the amount of non-hydrogenated aromatic rings is reduced by increasing the degree of aromatic ring-hydrogenation of a high-molecular weight aromatic vinyl copolymer, the compatibility of the whole resultant polymers increases, to prevent the formation of domains. As a result, the resultant polymer has a high transparency. The prevention of the clouding which is caused by the difference in the degrees of hydrogenation of aromatic rings, attributable to the molecular weight, is generally largely affected by the kinds of solvent and catalyst used.

The catalyst used in the hydrogenation reaction is selected from those capable of increasing the hydrogenation rate, but not reducing the molecular weight of the starting copolymer and not inducing the reaction of the solvent per se under the hydrogenation conditions. Specifically, a solid catalyst formed by supporting palladium (Pd) on a carrier is preferred because the supported metal has a large surface area.

Generally, activated carbon, alumina ($Al_2O_3$), silica ($SiO_2$), silica-alumina ($SiO_2$—$Al_2O_3$), diatomaceous earth, titanium oxide, zirconium oxide, etc. are used as the carrier for catalysts. However, activated carbon and alumina make the uniform hydrogenation of aromatic rings difficult, to result in a poor transparency in many cases. It has been found that this problem is solved by the use of a zirconium oxide carrier. Namely, it has been found that the hydrogenation of aromatic rings proceeds uniformly at a high reaction rate in the presence of a catalyst composed of the zirconium oxide carrier which supports palladium, to provide a highly transparent hydrogenated polymer. It has been further found that the difference in the degrees of hydrogenation of aromatic rings, which is attributable to the different molecular weights of the aromatic vinyl compound-(meth)acrylate copolymer, is small, and therefore, the hydrogenation proceeds unexpectedly uniformly when the hydrogenation is conducted in the presence of such catalyst.

Even if the aromatic rings are hydrogenated not uniformly in the course of the hydrogenation, domains are not formed when the degree of hydrogenation finally reaches near 100%, thereby obtaining a highly transparent, hydrogenated polymer. However, when the catalyst is used for a long period of time or used repeatedly, a degree of hydrogenation of about 100% cannot be achieved. In contrast, since the aromatic rings are uniformly hydrogenated in the presence of the catalyst containing zirconium oxide supporting palladium, a highly transparent, hydrogenated polymer having a total light transmittance of 90% or more is surely obtained in the present invention even when the degree of hydrogenation is, for example, less than 90 mol %. Thus, the present invention is significantly advantageous in industrial productions.

Whether or not the hydrogenation proceeds uniformly can be evaluated by the molecular weight distribution of the polymer having non-hydrogenated aromatic rings in the product, namely, can be evaluated by comparing the weight-average molecular weight (Mw2) of the polymer having non-hydrogenated aromatic rings with the weight-average molecular weight (Mw1) of the copolymer before hydrogenation, each being measured by a gel permeation chromatography. If the aromatic rings of a low-molecular weight, aromatic vinyl copolymer are preferentially hydrogenated, the molecular weight distribution of the polymer having non-hydrogenated aromatic rings will shift to the high molecular weight side, as compared with the molecular weight distribution before hydrogenation. Namely, the weight-average molecular weight of the polymer having non-hydrogenated aromatic rings increases to result in an extremely large Mw2/Mw1. If the aromatic rings of a low-molecular weight, aromatic vinyl copolymer and high-molecular weight, aromatic vinyl copolymer are hydrogenated uniformly or in the same degree, the molecular weight distribution of the polymer having non-hydrogenated aromatic rings will be nearly the same as before the hydrogenation or shift only slightly to the high molecular weight side, to result in a smaller Mw2/Mw1. In the hydrogenation in the presence of the catalyst containing palladium-supporting zirconium oxide, Mw2/Mw1 is 1.5 or less, showing a uniform hydrogenation. A ratio, Mw2/Mw1, of 2 or more shows that the aromatic rings of the low-molecular weight, aromatic vinyl copolymer are preferentially hydrogenated, to likely to cloud the obtained resins.

The activity of the catalyst containing palladium-supporting zirconium oxide is little reduced even after reuse, and the hydrogenation in the presence of the reused catalyst proceeds also uniformly as in the case of the initial stage of use, to ensure the stable production of a highly transparent, hydrogenated polymer for a long period of time or repeatedly.

The supported amount of metallic palladium is preferably from 0.01 to 50% by weight, more preferably from 0.05 to 20% by weight and still more preferably from 0.1 to 10% by weight, each based on the weight of the zirconium oxide carrier. Since palladium is an expensive noble metal, it is economically preferred to minimize the amount to be used. When the carrier is zirconium oxide, palladium is supported on the carrier in a highly dispersed state, to extremely increase the hydrogenation rate per unit weight of palladium. Therefore, a sufficient hydrogenation rate is obtained even when the supported amount of palladium is as small as 0.1 to 0.5% by weight. The degree of dispersion of palladium throughout the carrier may be measured by known methods such as a pulse adsorption method using carbon monoxide. The larger the degree of dispersion, the better.

The precursor for metallic palladium may include known salts and complexes such as palladium chloride, palladium nitrate and palladium acetate. In the preparation of the catalyst, a solution of palladium chloride in hydrochloric acid or an aqueous sodium hydroxide solution, a solution of palladium nitrate in water or hydrochloric acid, and a solution of palladium acetate in hydrochloric acid or an organic solvent are usable. Preferably, the catalyst containing palladium which is highly dispersed is prepared by impregnating the zirconium oxide carrier with a solution of palladium acetate in an organic solvent such as acetone, acetonitrile and 1,4-dioxane, removing the solvent, drying, and then, calcining the dried carrier preferably at 200 to 800° C.

The zirconium oxide carrier may be produced by ordinary methods, for example, by a method of hydrolyzing zirconium oxychloride, zirconyl nitrate or zirconyl sulfate, or by a method of neutralizing zirconium oxychloride, zirconyl nitrate or zirconyl sulfate with an alkali such as ammonia, ammonium carbonate, sodium hydroxide and sodium carbonate to precipitate zirconium hydroxide or an amorphous zirconium oxide hydrate, followed by burning the resultant precipitate. Alternatively, the zirconium oxide may be produced by the thermal decomposition of zirconium oxychloride or zirconium alkoxide or the gas-phase oxidative decomposition of zirconium tetrachloride. The water content, specific surface area, pore size and pore volume may be varied by controlling the calcining temperature of zirconium oxide hydrate or zirconium hydroxide. The calcination is conducted preferably at 300 to 800° C. because zirconium oxide having a large surface area is obtained. In view of the degree of dispersion and hydrogenation activity of the supported palladium, the pore size is preferably from 20 to 3,000 Å and the specific surface area is preferably 10 m$^2$/g or more.

If necessary, palladium may be supported on zirconium oxide which is supported on another carrier in advance. Further, zirconium oxide supporting palladium may be mixed with a binder such as a clay compound and then molded into a desired shape. In such cases, the content of zirconium oxide is preferably 10% by weight or more on the basis of a total weight of the catalyst components.

The aromatic vinyl compound-(meth)acrylate copolymer is hydrogenated in a suitable solvent. Preferred are solvents which are capable of well dissolving the copolymer before and after the hydrogenation and well dissolving hydrogen and undergo no hydrogenation. Also, the solvent is preferably selected from those which ensure a rapid hydrogenation. Since the solvent is removed by volatilization after the hydrogenation, a higher ignition point would be preferred. Examples of the solvents satisfying all of these requirements include carboxylic esters.

The carboxylic esters are preferably aliphatic carboxylic esters represented by the following formula 1:

$$R^1COOR^2 \qquad (1)$$

wherein $R^1$ is an alkyl group having 1 to 6 carbon atoms or a cycloalkyl having 3 to 6 carbon atoms; and $R^2$ is an alkyl group having 1 to 6 carbon atoms or a cycloalkyl having 3 to 6 carbon atoms.

Examples of $R^1$ and $R^2$ include methyl, ethyl, propyl, isopropyl, butyl, isobutyl, pentyl, hexyl and cyclohexyl. Examples of the carboxylic ester include methyl acetate, ethyl acetate, n-butyl acetate, pentyl acetate, methyl propionate, ethyl propionate, n-propyl propionate, n-butyl propionate, methyl n-butyrate, methyl isobutyrate, n-butyl n-butyrate, methyl n-valerate and methyl n-hexanoate, with methyl acetate, ethyl acetate, methyl propionate, methyl isobutyrate and methyl n-butyrate being preferably used.

The concentration of the aromatic vinyl compound-(meth)acrylate copolymer in the solution for the hydrogenation is preferably from 1 to 50% by weight, more preferably from 3 to 30% by weight and still more preferably from 5 to 20% by weight. Within the above range, the reduction of reaction rate and the poor handling ability due to increased viscosity can be avoided, to make the process preferred in view of productivity and economy.

The hydrogenation may be conducted in either a slurry-bed or fixed-bed manner, and also, in either a batch-wise or continuous manner.

In a slurry-bed hydrogenation, the particle size of the carrier is preferably from 0.1 to 1,000 μm, more preferably from 1 to 500 μm and still more preferably from 5 to 200 μm. Within the above range, the separation of the catalyst after the hydrogenation is easy and a sufficient reaction rate is obtained.

In a batch-wise hydrogenation, the amount of catalyst to be used is preferably from 0.0005 to 10 parts by weight per 100 parts by weight of the starting copolymer when expressed by the amount of palladium. In a continuous flow hydrogenation, a solution of the starting copolymer is supplied so that the supplied amount of the starting copolymer per unit amount of the catalyst, i.e., space velocity, is preferably from 0.001 to 1 $h^{-1}$.

The hydrogenation is preferably carried out at 60 to 250° C. under a hydrogen pressure of 3 to 30 MPa for 3 to 15 h. When the reaction temperature is within the above range, a sufficient reaction rate is obtained and the decomposition of the starting copolymer and hydrogenated polymer is avoided. When the hydrogen pressure is within the above range, a sufficient reaction rate is obtained.

After the hydrogenation, the catalyst is separated from the reaction product mixture for recovery by known methods such as filtration and centrifugal separation. In view of discoloration and adverse influences on mechanical properties, the concentration of residual metal in the obtained hydrogenated polymer is preferably as low as possible. The concentration of residual metal is preferably 10 ppm or less and more preferably 1 ppm or less. To omit the complicated procedures such as filtration and centrifugal separation, a fixed-bed hydrogenation is preferably employed.

After the separation of the catalyst, the solvent is removed from the solution of the hydrogenated polymer and then the hydrogenated polymer is purified. The hydrogenated polymer is separated by the following known methods:
(1) a method of continuously removing the solvent from the solution of the hydrogenated polymer to prepare a concentrated solution, melt-extruding the concentrated solution, and then pelletizing the extruded product;
(2) a method of evaporating off the solvent from the solution of the hydrogenated polymer to obtain a massive material and then pelletizing the massive material;
(3) a method of pouring the solution of the hydrogenated polymer into a poor solvent or vice versa to precipitate the hydrogenated polymer and then pelletizing the precipitate; and
(4) a method of contacting the solution of the hydrogenated polymer with hot water to form a massive material and then pelletizing the massive material.

The hydrogenated polymer produced by the process of the present invention may be made into an optical composition by a known method. Since the optical composition containing the hydrogenated polymer is thermoplastic, the composition may be made into light-diffusible precision optical products with low costs by various thermoforming processes such as extrusion, injection molding and secondary processing of sheets. The light-diffusible optical products are applied to light guide plates, light guide bodies, display front panels, plastic lens substrates, optical filters, optical films, illumination covers and illumination advertising displays.

The present invention will be described in more detail below with reference to the following examples. However, these examples are only illustrative and not intended to limit the invention thereto.

The resins were evaluated by the following methods.

(1) Degree of Hydrogenation of Aromatic Rings

Determined by the rate of reduction in the absorption at 260 nm measured by UV spectrometry before and after the hydrogenation.

(2) Weight-Average Molecular Weight

The weight-average molecular weight (Mw1) before hydrogenation and the weight-average molecular weight (Mw3) after hydrogenation were determined by a gel permeation chromatography (GPC) using an RI detector. The solvent was THF and the measured results were calibrated by a standard polystyrene.

(3) Uniformity of Hydrogenation

The weight-average molecular weight (Mw2) of the polymer having non-hydrogenated aromatic rings in the reaction product was determined by GPC using a UV detector (260 nm). The uniformity of hydrogenation was evaluated by Mw2/Mw1. A ratio of 1.5 or less shows that the hydrogenation proceeds uniformly.

(4) Degree of Dispersion of Metallic Palladium

Measured by a CO pulse adsorption method. CO/Pd was set equal to 1 for calculation.

(5) Total Light Transmittance

The powder of hydrogenated polymer was dried under reduced pressure at 80° C. for 4 h, which was then compression-thermoformed into a test piece (flat plate of 3.2 mm×30 mm×30 mm) at 210° C. under 10 MPa in a mirror-finished mold using a hydraulic molding machine available from Toho Press Seisakusho Co., Ltd. The test piece was measured for its total light transmittance by a through-transmission method according to JIS K7105 using a turbidimeter "COH-300A" available from Nippon Denshoku Industries Co., Ltd.

EXAMPLE 1

(1) Catalyst

A solution of 0.0527 g (0.000235 mol) of palladium acetate in 30 g of acetone was impregnated into 4.975 g of a dried zirconium oxide carrier ("NNC100" available from Daiichi Kigenso Kagaku Kogyo Co., Ltd.) at 40° C. under stirring. After removing acetone at 60° C. while reducing the pressure, the carrier was dried at 120° C. for 4 h and calcined at 400° C. for 3 h to obtain a 0.5 wt % $Pd/ZrO_2$ catalyst. The degree of dispersion of metallic palladium was 85%.

(2) Hydrogenation

A solution of 5 g of an MMA-styrene copolymer having a weight-average molecular weight (Mw 1) of 170,0000 ("MS 600" available from Nippon Steel Chemical Co., Ltd., MMA/styrene is 6/4 by mole) in 45 g of methyl isobutyrate (IBM) and 0.25 g of the 0.5 wt % $Pd/ZrO_2$ catalyst were charged into a 200-mL autoclave. The hydrogenation was allowed to proceed at 200° C. under a hydrogen pressure of 9 MPa for 12 h. After removing the catalyst by filtration, the reaction product solution was added dropwise into an excess of methanol and the precipitated polymer was recovered. The final degree of hydrogenation of the polymer was 99.1%, and the total light transmittance was 92%. The reaction solutions sampled in the course of the hydrogenation were measured to determine the degree of hydrogenation and the weight-average molecular weight (Mw2) of the polymer containing non-hydrogenated aromatic rings. The change of hydrogenation with time is shown in Table 1. The sampled solutions were all transparent, showing that the hydrogenation proceeded uniformly.

Separately, the reaction solution was withdrawn through a filter. The elution of palladium was not found (0.01 ppm or less).

Thereafter, a fresh raw solution was subjected to hydrogenation in the same manner for 12 h in the presence of the recovered catalyst. The degree of hydrogenation was 99.1%, and the total light transmittance was 92%. The solutions sampled during the hydrogenation were transparent.

TABLE 1

(Example 1)

| Reaction time (h) | Degree of hydrogenation (%) | Mw1 | Mw2 | Appearance of solution |
|---|---|---|---|---|
| 2 | 79.7 | 170,000 | 170,000 | transparent |
| 4 | 95.8 | 170,000 | 170,000 | transparent |
| 6 | 97.7 | 170,000 | 182,000 | transparent |
| 9 | 99.0 | 170,000 | 190,000 | transparent |
| 12 | 99.1 | 170,000 | 190,000 | transparent |

COMPARATIVE EXAMPLE 1

(1) Catalyst

A 10 wt % Pd/C catalyst ("Type PE" available from N.E. Chemcat Corporation) was used. The degree of dispersion of metallic palladium was 14%.

(2) Hydrogenation

The hydrogenation was conducted in the same manner as in Example 1 except for using 0.2 g of the 10 wt % Pd/C catalyst ("Type PE" available from N.E. Chemcat Corporation). The final degree of hydrogenation of the polymer was 99.1%, and the total light transmittance was 92%. However, as shown in Table 2, the solutions withdrawn after 3 h and 6 h of the hydrogenation were clouded. The polymer recovered from each solution was thermoformed into a plate, which had a total light transmittance of less than 90%.

The hydrogenation was repeated in the same manner as in Example 1 on a freshly charged raw solution. The degree of hydrogenation was lowered to 85%.

TABLE 2

(Comparative Example 1)

| Reaction time (h) | Degree of hydrogenation (%) | Mw1 | Mw2 | Appearance of solution |
|---|---|---|---|---|
| 3 | 92.6 | 170,000 | 432,000 | clouded |
| 6 | 97.9 | 170,000 | 341,000 | clouded |
| 9 | 99.0 | 170,000 | 285,000 | transparent |
| 12 | 99.1 | 170,000 | 250,000 | transparent |

COMPARATIVE EXAMPLE 2

(1) Catalyst

A solution of 0.1055 g (0.00047 mol) of palladium acetate in 30 g of acetone was impregnated into 4.975 g of α-alumina at 40° C. under stirring. After removing acetone at 60° C. while reducing the pressure, the carrier was dried at 120° C. for 4 h and calcined at 400° C. for 3 h, to obtain a 1 wt % Pd/Al$_2$O$_3$ catalyst. The degree of dispersion of metallic palladium was 20%.

(2) Hydrogenation

The hydrogenation was conducted in the same manner as in Example 1 except for using 0.5 g of the 1 wt % Pd/Al$_2$O$_3$ catalyst and changing the hydrogenation time to 15 h. The final degree of hydrogenation of the polymer was 98.8%, and the total light transmittance was 92%. However, as shown in Table 3, the solutions withdrawn after 4 h and 8 h of the hydrogenation were clouded. The polymer recovered from each solution was thermoformed into a plate, which had a total light transmittance of less than 90%.

The hydrogenation was repeated on a freshly charged raw solution in the same manner as in Example 1 except for changing the hydrogenation time to 15 h. The degree of hydrogenation was lowered to 92%.

TABLE 3

(Comparative Example 2)

| Reaction time (h) | Degree of hydrogenation (%) | Mw1 | Mw2 | Appearance of solution |
|---|---|---|---|---|
| 4 | 88.0 | 170,000 | 320,000 | slightly clouded |
| 8 | 94.0 | 170,000 | 310,000 | slightly clouded |
| 15 | 98.8 | 170,000 | 280,000 | transparent |

EXAMPLE 2

The hydrogenation was conducted in the same manner as in Example 1 except for change the amount of the catalyst used to 0.1 g, to recover the polymer. The degree of hydrogenation of the polymer was 96.5%, and the total light transmittance was 92%. The solutions withdrawn after 4 h, 6 h and 9 h of the hydrogenation were all transparent.

EXAMPLE 3

The hydrogenation was conducted in the same manner as in Example 1 except for change the reaction temperature to 175° C., to recover the polymer. The degree of hydrogenation of the polymer was 99.0%, and the total light transmittance was 92%. The solutions withdrawn after 6 h and 9 h of the hydrogenation were all transparent.

EXAMPLE 4

The hydrogenation was conducted in the same manner as in Example 1 except for change the hydrogen pressure to 7MPa, to recover the polymer. The degree of hydrogenation of the polymer was 96.2%, and the total light transmittance was 92%. The solutions withdrawn after 6 h and 9 h of the hydrogenation were all transparent.

EXAMPLE 5

(1) Catalyst

A solution of 0.0105 g (0.000047 mol) of palladium acetate in 10 g of acetone was impregnated into 4.975 g of a dried zirconium oxide carrier ("NNC100" available from Daiichi Kigenso Kagaku Kogyo Co., Ltd.) at 40° C. under stirring. After removing acetone at 60° C. while reducing the pressure, the carrier was dried at 120° C. for 4 h and calcined at 400° C. for 3 h to obtain a 0.1 wt % Pd/ZrO$_2$ catalyst. The degree of dispersion of metallic palladium reached 90%.

(2) Hydrogenation

The hydrogenation was conducted in the same manner as in Example 1 except for using 0.5 g of the above catalyst, to recover the polymer. The degree of hydrogenation of the polymer was 96.6%, and the total light transmittance was 92%. The solutions withdrawn after 4 h, 6 h and 9 h of the hydrogenation were all transparent.

EXAMPLE 6

(1) Catalyst

Into a solution of 0.0835 g (0.00047 mol) of palladium chloride and 0.055 g (0.00094 mol) of sodium chloride in 10 g of water, 9.95 g of a zirconium oxide carrier ("NNC100" available from Daiichi Kigenso Kagaku Kogyo Co., Ltd.) was added, and then, 10 g (0.0099 mol) of a 3% aqueous formalin and 10 g (0.0033 mol) of a 1.3% aqueous NaOH solution were further added under stirring, to deposit palladium on the zirconium oxide carrier. After filtration, the filtered product was repeatedly washed with water until the filtrate was no longer clouded by a 0.1 N aqueous $AgNO_3$ solution and then dried at 120° C., to obtain a 0.5 wt % $Pd/ZrO_2$ catalyst. The degree of dispersion of metallic palladium was 25%.

(2) Hydrogenation

The hydrogenation was conducted in the same manner as in Example 1 except for using 0.5 g of the above catalyst, to recover the polymer. The degree of hydrogenation of the polymer was 98.5%, and the total light transmittance was 92%. The solutions withdrawn after 4 h, 6 h and 9 h of the hydrogenation were all transparent.

EXAMPLE 7

(1) Catalyst

Into a solution of 0.0835 g (0.00047 mol) of palladium chloride and 9.4 cc (0.00094 mol) of a 0.1 N HCl in 10 g of water, 9.95 g of a zirconium oxide carrier ("NNC100" available from Daiichi Kigenso Kagaku Kogyo Co., Ltd.) was added, and then, 10 g (0.0099 mol) of a 3% aqueous formalin and 10 g (0.0033 mol) of a 1.3% aqueous NaOH solution were further added under stirring, to deposit palladium on the zirconium oxide carrier. After filtration, the filtered product was repeatedly washed with water until the filtrate was no longer clouded by a 0.1 N aqueous $AgNO_3$ solution and then dried at 120° C., to obtain a 0.5 wt % $Pd/ZrO_2$ catalyst. The degree of dispersion of metallic palladium was 30%.

(2) Hydrogenation

The hydrogenation was conducted in the same manner as in Example 1 except for using 0.25 g of the above catalyst, to recover the polymer. The degree of hydrogenation of the polymer was 97.9%, and the total light transmittance was 92%. The solutions withdrawn after 4 h, 6 h and 9 h of the hydrogenation were all transparent.

EXAMPLE 8

(1) Catalyst

A solution of 0.0417 g (0.000235 mol) of palladium chloride and 4.7 cc (0.00047 mol) of a 0.1 N HCl in 10 g of water was impregnated into 4.975 g of a zirconium oxide carrier ("NNC100" available from Daiichi Kigenso Kagaku Kogyo Co., Ltd.) at 40° C. After removing water at 70° C. while reducing the pressure, the carrier was dried at 120° C. for 4 h and calcined at 400° C. for 3 h. The calcined product was subjected to a reduction treatment at 240° C. in a flow of a mixed gas of 10% hydrogen and 90% nitrogen at a flow rate of 50 cc/min, to obtain a 0.5 wt % $Pd/ZrO_2$ catalyst. The degree of dispersion of metallic palladium reached 45%.

(2) Hydrogenation

The hydrogenation was conducted in the same manner as in Example 1 except for using 0.25 g of the above catalyst, to recover the polymer. The degree of hydrogenation of the polymer was 99.3%, and the total light transmittance was 92%. The solutions withdrawn after 4 h, 6 h and 9 h of the hydrogenation were all transparent.

EXAMPLE 9

(1) Catalyst

A solution of 0.527 g (0.00235 mol) of palladium acetate in 300 g of acetone was impregnated into 49.75 g of a dried zirconium oxide carrier ("NNC100" available from Daiichi Kigenso Kagaku Kogyo Co., Ltd.) at 40° C. under stirring. After removing acetone at 60° C. while reducing the pressure, the carrier was dried at 120° C. for 4 h and calcined at 400° C. for 3 h to obtain a 0.5 wt % $Pd/ZrO_2$ catalyst. A mixture of the obtained catalyst, 2.7 g of bentonite as a binder and 45 g of water was kneaded, extruded, calcined at 400° C., and crushed to a particle size of 0.5 to 1 mm, to prepare the catalyst for fixed-bed reaction.

(2) Hydrogenation

A 1.5-mm$\phi$ SUS316 tube reactor was packed with 10 g of the catalyst for fixed-bed reaction and then the temperature was raised to 200° C. while passing hydrogen through the reactor under 9 MPa at a flow rate of 50 cc/min. Then, the fixed-bed flow hydrogenation was conducted by feeding a 5 wt % methyl isobutyrate solution of an MMA-styrene copolymer having a weight-average molecular weight of 170,0000 ("MS 600" available from Nippon Steel Chemical Co., Ltd., MMA/styrene is 6/4 by mole) at a feeding rate of 10 g/h. The degree of hydrogenation after 24 h was 98.8%, and the total light transmittance was 92%. The degree of hydrogenation after continued the hydrogenation for 1000 h was 95.0%, and the total light transmittance was 92%.

In accordance with the present invention, the aromatic rings of an aromatic vinyl compound-(meth)acrylate copolymer are stably and uniformly hydrogenated for a long period of time or repeatedly. The hydrogenated polymer obtained exhibits a high transparency, low birefringence, high heat resistance, high surface hardness, low water absorption, low specific gravity, high transfer property and excellent mold releasability. The hydrogenated polymer is particularly excellent in the properties required for optical materials and widely applicable to optical lenses, light guide plates, light diffuser plates, optical disk substrates, and display front panels. Thus, the present invention is of great industrial advantage.

What is claimed is:

1. A process for producing a hydrogenated polymer, which comprises a step of hydrogenating aromatic rings of an aromatic vinyl compound-(meth)acrylate copolymer in a solvent in the presence of a catalyst, wherein the aromatic vinyl compound-(meth)acrylate copolymer has a molar ratio A/B of from 0.25 to 4.0 wherein A is a molar number of constitutional units derived from the (meth)acrylate monomer, and B is a molar number of constitutional units derived from the aromatic vinyl monomer; and wherein the catalyst comprises zirconium oxide supporting palladium.

2. The process according to claim 1, wherein a total light transmittance of the hydrogenated polymer is 90% or higher when measured by a method according to JIS K7105.

3. The process according to claim 1, wherein a weight-average molecular weight of the copolymer is from 10,000 to 1,000,000.

4. The process according to claim 1, wherein a degree of hydrogenation of the aromatic rings is 70% or higher.

5. The process according to claim 1, wherein the (meth) acrylate monomer comprises from 80 to 100 mol % of methyl methacrylate and from 0 to 20 mol % of an alkyl acrylate, and the aromatic vinyl monomer is styrene.

6. The process according to claim 1, wherein a ratio of Mw2/Mw1 is 1.5 or less, wherein Mw1 is a weight-average molecular weight of the copolymer before hydrogenation and Mw2 is a weight-average molecular weight of a polymer having non-hydrogenated aromatic rings in the hydrogenated polymer.

7. The process according to claim 1, wherein palladium is supported in an amount of from 0.01 to 50% by weight on the basis of a weight of zirconium oxide.

8. The process according to claim 1, wherein the solvent is a carboxylic ester.

9. The process according to claim 1, wherein palladium is derived from a precursor selected from the group consisting of palladium acetate, palladium chloride and palladium nitrate.

* * * * *